Oct. 3, 1961    C. J. MARCHETTI ET AL    3,002,710
HELICOPTERS
Filed May 3, 1957    7 Sheets-Sheet 1
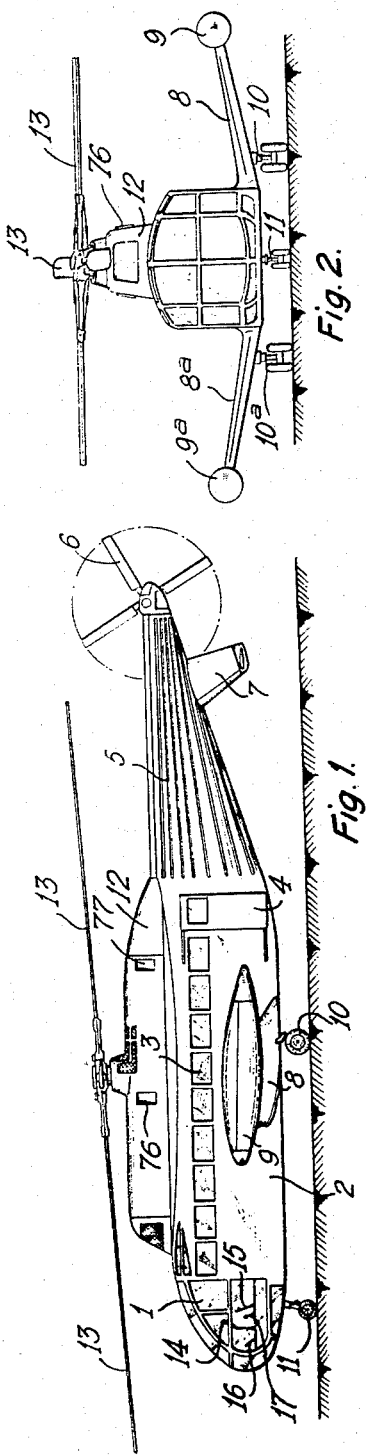
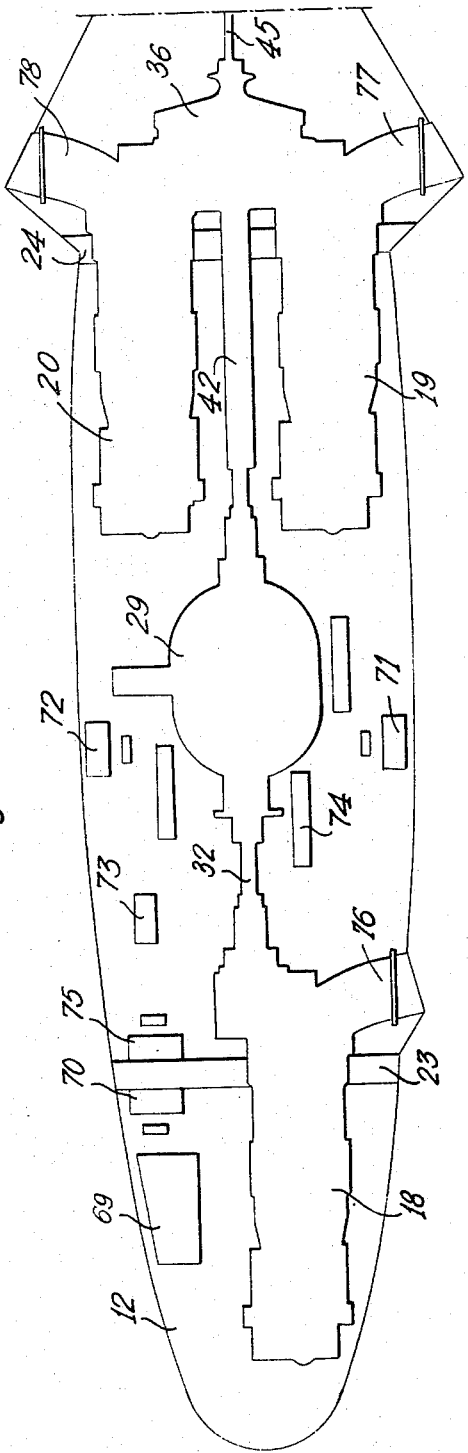

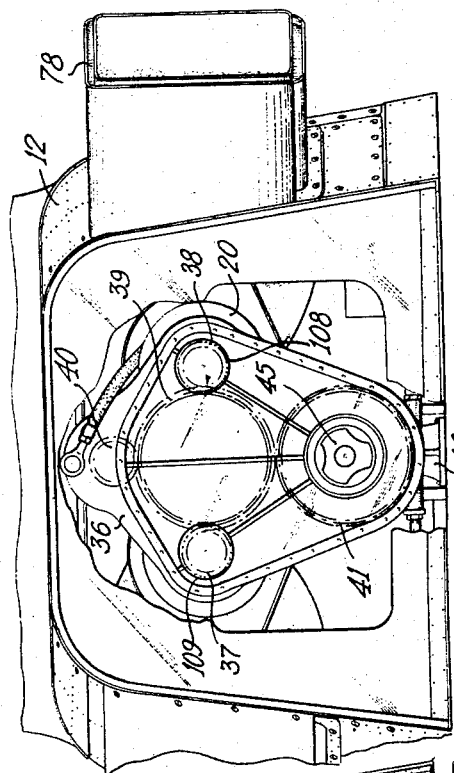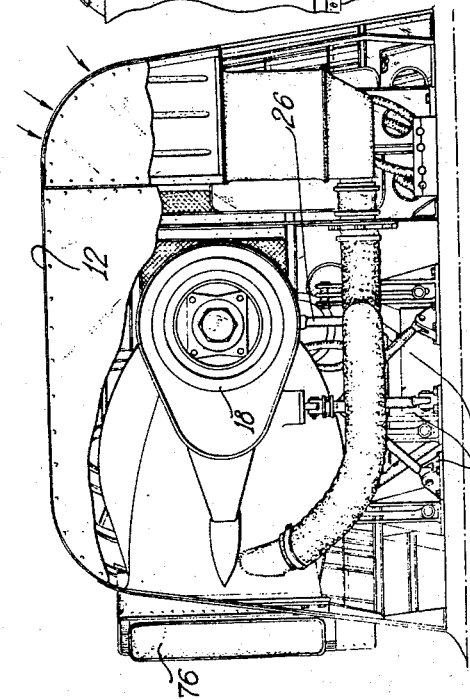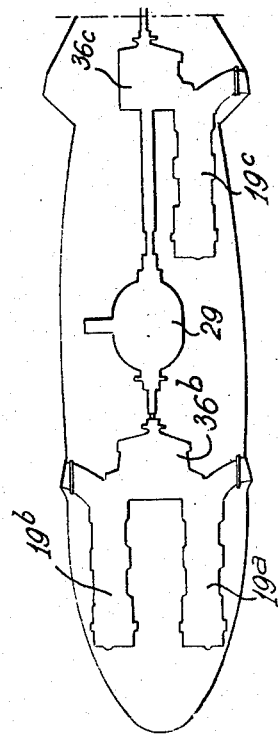

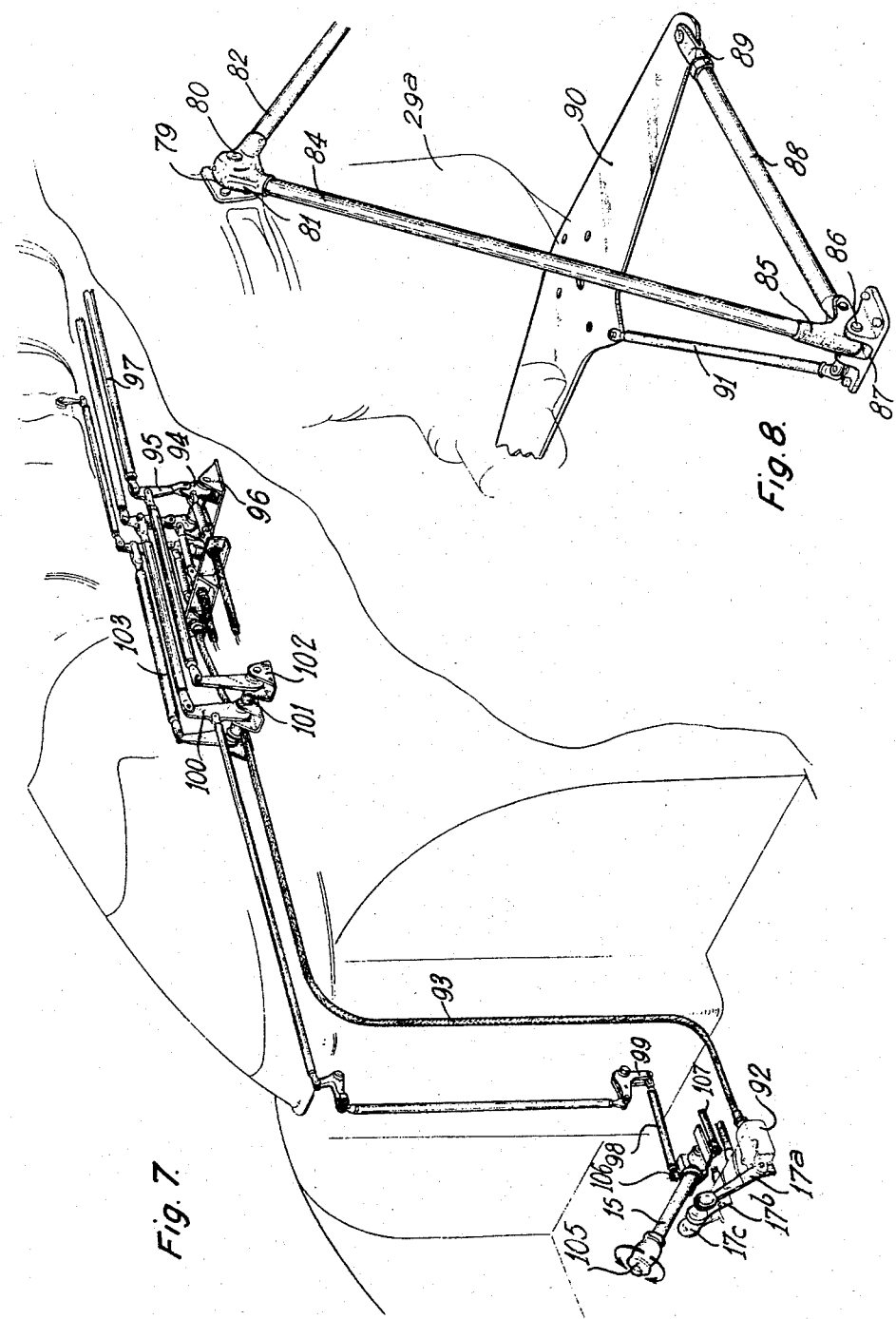

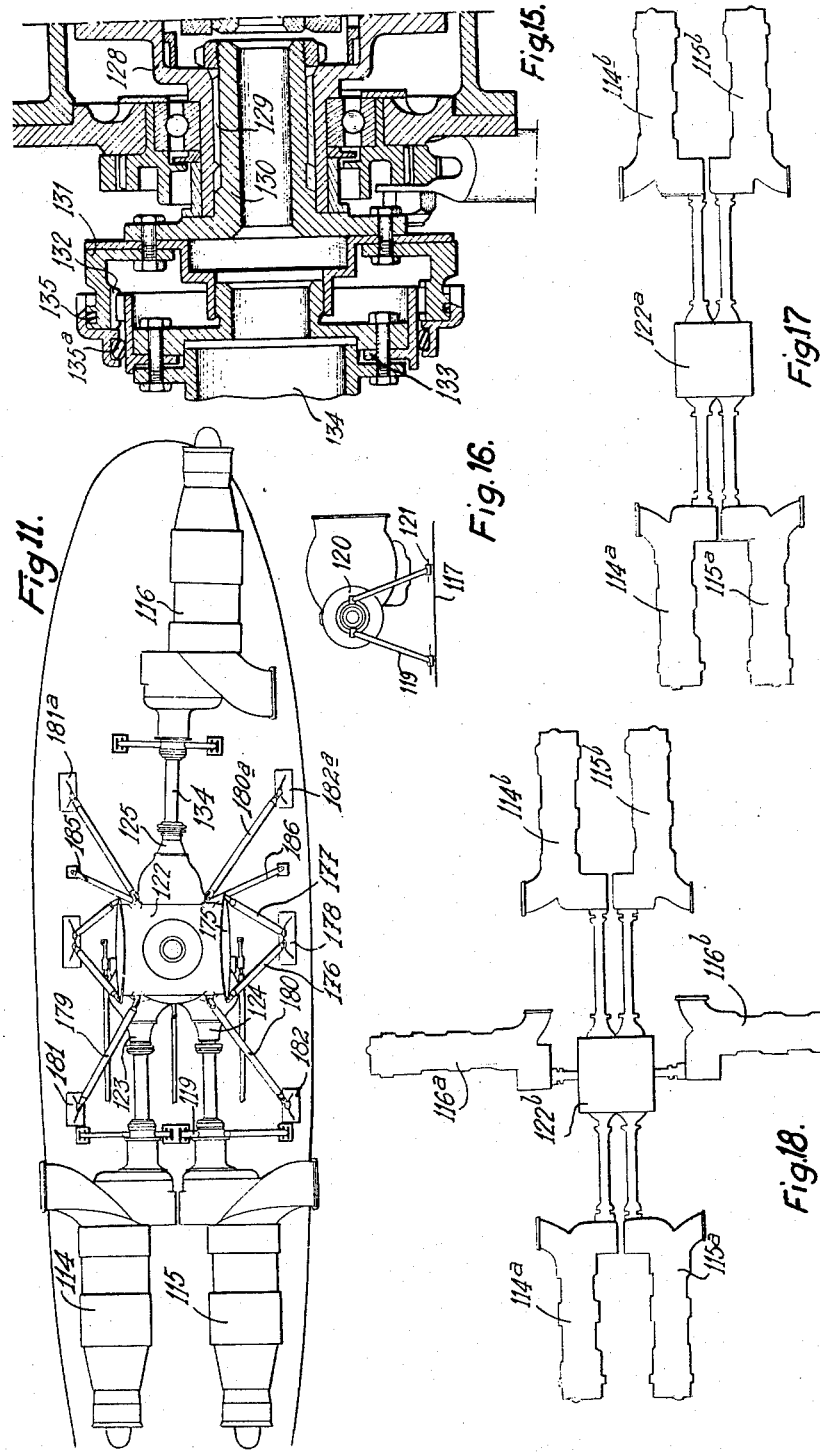

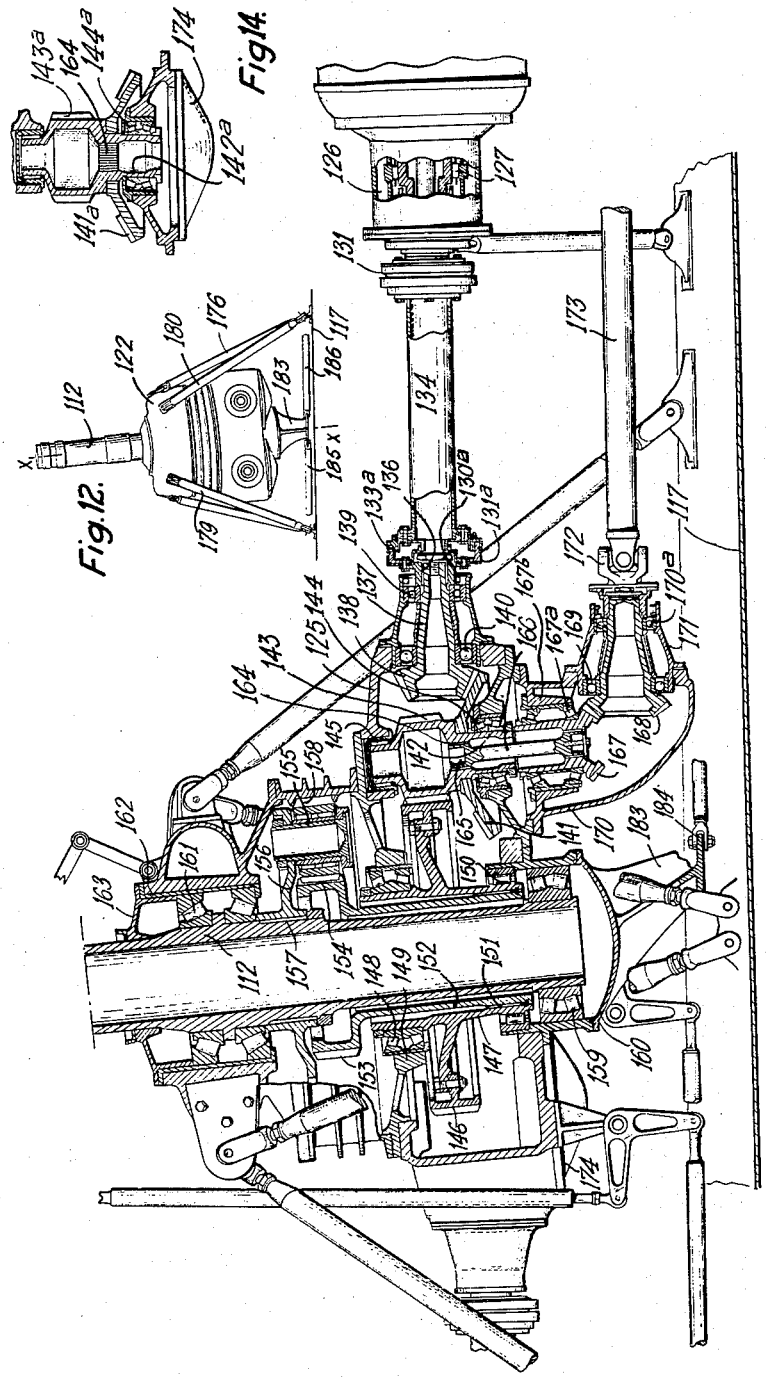

United States Patent Office 3,002,710
Patented Oct. 3, 1961

3,002,710
HELICOPTERS
Charles Joseph Marchetti, Vanves, and Charles Henri Tresch, Boulogne-sur-Seine, France, assignors to Sud-Aviation Societe Nationale de Constructions Aeronautiques, Paris, France
Filed May 3, 1957, Ser. No. 656,806
Claims priority, application France May 15, 1956
12 Claims. (Cl. 244—17.17)

The present invention relates to helicopters and has more particularly for its object to provide definite improvements in large-sized helicopters.

In heavy tonnage helicopter construction the multi-rotor design has frequently been preferred for various reasons. However, this solution, in addition to the extremely complicated design of the mechanical connections provided for reducing to a minimum the aerodynamic interaction between the rotors and also in the controls, and due to the considerable length of these controls, is complicated by aerodynamic problems, by difficulties in manoeuvring and stabilizing the aircraft, and also by a substantial increase in the maintenance expenses and freight-per-ton cost.

In order to avoid these drawbacks it is the essential object of this invention to provide a single-rotor helicopter of relatively heavy tonnage, having a continuous or streamlined, low-drag fuselage provided with fixed low wings carrying wing-tip fuel tanks, the rear portion of the fuselage forming a tapered tail carrying at its rear end a conventional anti-torque rotor and tail fins, the cabin accommodated in this fuselage behind the front pilot's cockpit being surmounted by a housing through which extends the control shaft of the helicopter rotor, said housing containing on either side of the rotor shaft at least three free turbine units having their axes parallel to the longitudinal plane of symmetry of the helicopter passing through said shaft and disposed in two groups respectively located in front of and behind said shaft, one of said turbines carrying the power take-off for driving the anti-torque tail rotor, these turbines being connected to said shaft through a transmission gearing, the helicopter rotor of relatively reduced diameter comprising a plurality of thin-sectioned blades having a high kinetic energy in operation, this rotor being associated with conventional-type general-pitch and cyclic-pitch control means, the aircraft assembly being supported by a landing-gear comprising lateral wheels secured under the stub wings and a front steering wheel.

Preferably, the rotor axis is slightly inclined forwards when the engine floor constituting the cabin ceiling is horizontal.

The blades of the helicopter rotor are advantageously of the type disclosed in the U.S. patent application Ser. No. 558,532 filed on January 11, 1956 by the same applicants.

According to an advantageous embodiment of the invention the two groups of free turbine units comprise a front turbine positioned on one side of the aircraft and two rear turbines disposed symmetrically to the longitudinal axis of the apparatus, these rear turbines being connected to a coupling case, the drive from these two rear turbines to the aforesaid transmission gearing being effected through a pair of shafts provided with universal joints, one shaft being coupled directly to the front turbine and the other to a power take-off provided on the coupling case of which another power take-off is drivingly connected to the anti-torque rear rotor.

In order to reduce the weight of the helicopter to a substantial extent, a constant problem in aircraft construction, the coupling- or counter-gearing cases according to another embodiment of this invention, are eliminated as well as the shafts with universal joints by directly connecting each turbine, through the medium of a free wheel and a connecting shaft rigid with a counter-gear, to another counter-gear constituting a first reducing-gear stage, this other counter-gear being rigid with a cylindrical pinion in meshing engagement with a horizontal, large-sized pinion of the transmission gearing.

The transmission gearing proper, according to this other embodiment of the invention, comprises its main cylindrical horizontal gear adapted, through a reducing stage of the epicyclic gear train type comprising a set of planet wheels overlying said main pinion, to drive the rotor driving shaft mounted in two anti-friction bearing assemblies, preferably of the roller type, disposed beneath the main cylindrical gear and above the reducing epicyclic gear train. Thus, a simplified reducing gearing is obtained between the turbine output shaft to the rotor driving shaft which ensures both a considerable gear-ratio reduction and a substantial saving in weight. As a result, the turbines may rotate at higher speeds and the over-all vertical dimension of the assembly is reduced.

The provision of a large-sized horizontal gear in this transmission gearing permits a better distribution of this gearing in width and, according to another feature of this invention, to use any desired and suitable number of turbines, each turbine driving the main horizontal gear through its counter-gear whereas the first reducing gear stage comprises the aforesaid cylindrical gear meshing with the horizontal gear. Thus, the helicopter according to this invention may be equipped with one or two front turbines, one or two rear turbines and, if desired and suitable, one or two lateral turbines disposed on either side of the helicopter, preferably symmetrically to the rotor driving shaft. The power take-offs of the transmission gearing, such as the one for driving the rear transmission shaft actuating the tail anti-torque rotor or those necessarily provided for driving the oil-pumps and like equipments, are positioned beneath the gearing case either through members operatively connected to the first gear reducing stage of some or all of the turbines, or through power take-off members driven from the main horizontal gear which are independent of the turbines.

This typical form of embodiment comprising a main horizontal gear with peripheral power input and output members affords not only a better, more balanced distribution of the reaction forces but also the use of identical power units. Finally, the gear ratio reduction obtained through a single row of planet gears ensures a better centering of the assembly as the latter is concentric to the rotor driving shaft extending therethrough, whilst the rigidity of this rotor driving shaft is increased to very safe limits due to the relatively important relative spacing of its bearings.

Other features and advantages of the present invention will appear as the following description proceeds with reference to the accompanying drawings forming part of this specification and illustrating diagrammatically by way of example the manner in which the invention may be carried out in the practice. In the drawings:

FIGS. 1 and 2 are a side-elevational view and front-elevational view respectively of a helicopter according to a first embodiment.

FIG. 4 is a diagram showing the relative arrangement of the turbines and their equipment in the turbine room of the helicopter illustrated in FIGS. 1 and 2.

FIG. 5 is a section taken in a larger scale in the plane V—V of FIG. 3.

FIG. 6 is another section taken on a larger scale in the plane VI—VI of FIG. 3.

FIG. 7 is a perspective diagram showing the turbine control system.

FIG. 8 is a perspective view showing a modified arrangement of the front left-hand fixation device of the transmission gearing.

FIG. 9 illustrates diagrammatically the turbine layouts in the case of a helicopter according to the first embodiment, with three turbines which are inverted relative to the layout of FIG. 4.

FIG. 11 is a plane view showing on a smaller scale the arrangement illustrated in FIG. 10.

FIG. 12 is a front elevational view of the transmission gearing and bare rotor shaft of the helicopter illustrated in FIG. 10.

FIG. 13 is a section taken upon a vertical longitudinal plane showing on a larger scale the transmission gearing and the devices for connecting this gearing with the rear turbine of the helicopter illustrated in FIGS. 10 and 12, the rotor shaft 112 being truncated.

FIG. 14 is an axial section of a detail showing the first gear reducing stage connecting one of the turbines to the transmission gearing illustrated in FIG. 13, without the power take-off.

FIG. 15 is a section showing on a larger scale the details of an expansion absorbing device fitted on the shaft connecting a turbine to the transmission gearing illustrated in FIG. 13.

FIG. 16 is a diagrammatic detail view showing the fixation of a turbine of the helicopter of FIG. 10 at the rear end of this turbine, and FIGS. 17 and 18 are diagrammatical engine-room layouts in the case of a helicopter according to a modified embodiment, with four turbines and six turbines respectively, the six-turbine arrangement comprising two transverse turbines.

Figure 3:
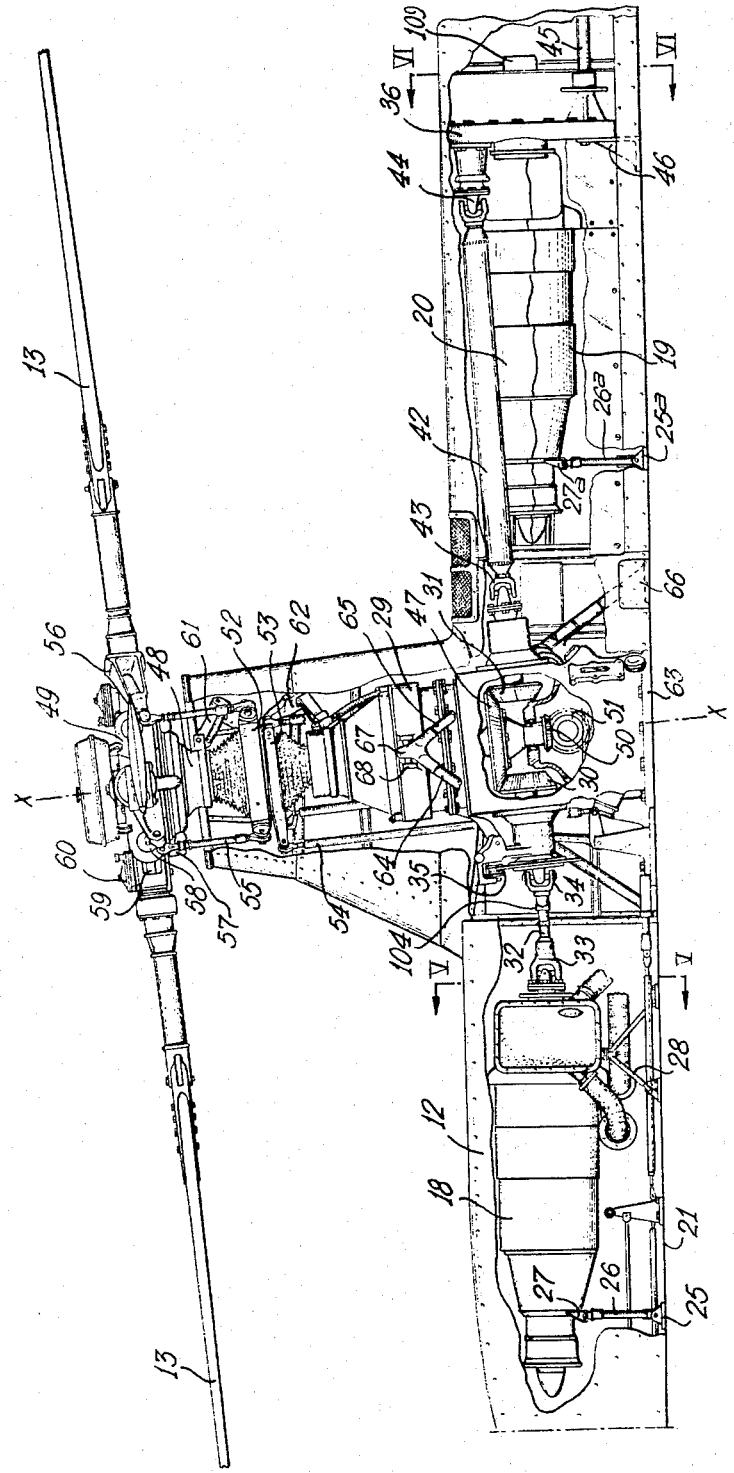
FIG. 3 is a fragmentary view drawn on a larger scale with parts broken away to show some details of the turbine room, the rotor shaft carrying its rotor proper and the transmission members connecting the turbines to this shaft, of the helicopter shown in FIGS. 1 and 2.

Referring first to the embodiment shown in FIGS. 1 and 2 of the drawings the helicopter according to this invention comprises a low-drag streamlined or continuous fuselage incorporating a pilot's cockpit 1 consisting of transparent elements affording a great visibility and a cabin 2 having port-lights 3 and a sliding door 4. The position of this cabin under the rotor facilitates the centering operations. At its rear end this fuselage has a very rigid tapered tail 5 carrying at its tip an anti-torque rotor 6 and fin elements 7.

This fuselage carries on either side and substantially amidships fixed low wings 8, 8a carrying in turn at their tips fuel tanks 9, 9a. Secured under these wings 8, 8a are two pairs of side wheels 10, 10a of a landing-gear completed by a pair of front steering wheels 11. The side wheels 10, 10a are relatively remote from the fuel tanks 9, 9a to increase the safety in case of accident. The fuel tanks 9, 9a are streamlined as now conventional for wing-tip tanks. This arrangement facilitates the refuelling operations and reduces the risks of fire when meeting with an accident. Preferably, jettison-tanks are used for this purpose.

Mounted on the fuselage portion constituting the cabin 2 is a housing 12 enclosing the power units driving the helicopter rotor shaft; this shaft extends through the housing 12 and carries at its upper end the rotor comprising in this embodiment four blades 13. The flying controls associated with this rotor are of conventional type and comprise means for controlling the longitudinal and lateral cyclic pitch, and other control means for the general pitch of the rotor blades. The pilot's cockpit 1 may be equipped with dual-control, each control set comprising a lever 14 controlling the cyclic pitch, a lever 15 controlling the general pitch, a set of pedals 16 and a lever 17 for controlling the power units separately.

In the embodiment illustrated in FIGS. 3 to 6 of the drawings the housing 12 encloses three free turbine units, that is, a front turbine 18 mounted on the left-hand side of the aircraft and two rear turbines 19, 20 disposed symmetrically relative to the longitudinal axis of the aircraft. These turbines are secured on the ceiling 21 of the cabin 2 which constitutes a fire-bulkhead provided if desired with shielding members 23, 24 on the rotor side of the turbines if the turbines are not of the non-bursting type. This ceiling constituting a partition between the power unit and the cabin is advantageous in that it reduces considerably the noises that are so unpleasant for the passengers. It is substantially horizontal when the helicopter is either flying or on the ground.

The front turbine is mounted in the front portion of the housing 12 on the floor 21 by means of a pair of lateral supports each comprising a yoke 25 secured on the floor 21 and a strut 26 having one end pivoted on said yoke and at its other end attached through an elastic joint on a support 27 mounted on the turbine case. These lateral supports permit moderate longitudinal displacements of the turbine; the rear end of the turbine 18 is supported by a tripod 28 having its vortex co-planar with the turbine axis. Each of the rear turbines 19, 20 is secured at the front through a pair of lateral supports consisting of elements 25a, 26a and 27a similar to the elements 25, 26 and 27 supporting the front portion of the front turbine.

The rotor axis X—X is slightly inclined forwards (about 6° from the vertical) when the floor 21 of the mechanism and power unit assembly is horizontal. The drive is transmitted to the rotor shaft through the medium of a transmission gearing 29 provided with a pair of diametrally opposite input gears 30, 31 having their axes inclined to accommodate the inclination of the rotor shaft. The power take-off of the front turbine 18 is located at the rear of, and is coaxial to, this turbine, and the connection with the relevant input gear 30 of the transmission gearing is effected through a short shaft 32 provided with two universal joints 33, 34 and a free-wheel device 104. Mounted on the outer portion of the hub of gear 30 is a rotor brake 35 of conventional type.

The pair of rear turbines 19, 20 mounted at a level slightly higher than the front turbine on the floor 21 are connected directly to a coupling gear case 36 disposed at their rear output ends through the medium of two small gears 37, 38 mounted on the end of the turbine shafts and meshing through a pair of free-wheel devices 108, 109 with a central toothed wheel 39 also enclosed in the case 36. This central wheel 39 meshes on the one hand with a small pinion 40 of same size as the aforesaid gears 37, 38 mounted in the upper portion of the case and on the other hand with a larger toothed wheel 41 mounted in the lower portion of the case. The toothed wheels 40, 41 have their axes co-planar with the axis of the helicopter. The toothed wheel 40 serves the purpose of transmitting the motion to the front and is connected through a shaft 42 provided with universal joints 43, 44 with the rear input pinion 31 mounted in the transmission gearing 29. The toothed wheel 41 constitutes a power take-off providing a drive at reduced speed at the rear of the aircraft and is connected through an adequate transmission 45 to the anti-torque tail rotor 6. The rear mounting and anchorage of the rear turbines 19 and 20 are effected by means of a support 46 secured on the floor 21 at the lower portion of the coupling gear case 36 symmetrically to and in alignment with the longitudinal axis of this floor.

The input pinions 30 and 31 of the transmission gearing 29 by which the motion and power output from the three turbines are combined together are bevel pinions meshing with a common bevel or crown wheel 47 disposed normally to the rotor shaft axis X—X. The motion is received from this crown wheel by a reduction-gear (not shown) of the type comprising a plurality of pinions meshing with an internally toothed stationary column. The reduced motion thus obtained is fed through the rotor shaft 48 to the rotor hub 49. The crown wheel 47 is coupled to a small pinion 50 driving through one or more bevel pinions 51 one or more lateral power take-offs which may be used for actuating the oil pump of the transmission gearing and driving a relay or servo-motor system for the engine auxiliaries.

Surrounding the shaft 48 and disposed in the conventional fashion is the cyclic plate assembly comprising the movable member 52 and the fixed member 53 with its pitch control links 55 attached to the pitch-change levers 56 carried by the rotor blades 13 and the lower blade rest 57. The rotor hub 49 comprises four flapping hinges 58 and the rotor blades themselves are provided with drag hinges 59 associated with suitable shock-absorbers 60 as conventional in helicopter rotor construction. The movable member 52 of the cyclic plate is connected to the shaft 48 in the usual manner through an inverted-V structure 61 and the fixed member 53 of this cyclic plate is held against any rotational motion by another V-shaped structure 62 secured on the case of the transmission gearing 29.

In the embodiment illustrated in FIG. 3 this transmission gearing 29 is shown as comprising at its lower portion a base plate 63 anchored on the floor 21 by means of a circular set of bolts. Moreover, it is anchored on either side by a pair of inverted-V forming tubular stays 64, 65 having their lower ends rigid with supports 66 and their upper ends rigidly interconnected through a metal fitting 67 pivoted about a longitudinal pin carried by a yoke 68 rigid with the case.

The assembly comprising the three turbines 18, 19, 20, transmission gearing 29 and four-bladed helicopter rotor 13, and overlying the passenger cabin, constitutes a mechanical and power-unit system distinctly separate from the other elements of the aircraft.

Housed in the turbine and gearing room are, in addition, the turbine accessories such as the oil tank 69, the oil radiators 70, 71, 72 of the turbines 18, 19, and 20, the fuel feed regulator 73, the servo-control 74 and the oil radiator 75 of the transmission gearing 29. The turbine gas exhaust pipes 76, 77, 78 lead laterally to the outside of the housing 12.

In the modified embodiment illustrated in FIG. 8 the case of the transmission gearing 29a carries lateral metal fittings 79 having projecting studs or pins 80. Mounted on each pin 80 is an inverted-V fitting 81 rigidly connecting a tube 82 similar to the tube 65 of the embodiment illustrated in FIG. 3 to a tube 84 rigidly assembled in turn with a tube 88 through a V-shaped fitting 85 pivoted on a pin 86 carried by a yoke 87 secured on the floor 21. The free end of the tube 88 is provided with an adjustable yoke 89 pivoted on a transverse plate 90 secured beneath the case of the transmission gearing 29a and connected to a symmetrical mounting provided on the other side of the case. This plate 90 is connected on the other hand through a tie-rod 91 to the aforesaid yoke 87. With this arrangement the horizontal components are absorbed by the structure, irrespective of their directions, and it is possible to slightly alter the inclination of the rotor axis, for example as a function of the intended purpose and version of the helicopter, while facilitating the assembling.

To control the three turbines, as shown in FIG. 7, the pilot may actuate separate power-regulating controls for each turbine and another control for simultaneously altering the aggregate power output of the three turbines.

The separate control consists of three levers 17a, 17b, 17c associated with the turbines 18, 19, 20 respectively and each adapted to transmit the control motion through a separate sheathed cable 93 connected to a swinging-link system comprising two links 94, 95 pivoted on each other, the link 94 being also pivoted on a supporting yoke 96 whilst the other link 95 is connected to the control rod 97 leading to the corresponding turbine. Preferably, the supporting yokes of the three swinging-link systems are aligned on a common pivot axis while being independent of one another.

The members provided for simultaneously controlling the power output of the three-turbine power unit comprise a twist-grip handle 105 carried by the general pitch control lever 15; this twist-grip handle 105 is connected through links, rods and levers such as 98 and 99 to the central lever 100 of a three-armed lever having its three arms connected in turn to a common tube 101 pivoted on aligned bearings 102. Each arm of the three-armed lever is connected to the relevant lever 95 through a link 103. The handle 105 is rigid with the external tube carrying at its lower end a lever 106 on which the link 98 is pivoted through a ball-and-socket joint. With this arrangement it is possible for the pilot to regulate the power output of the turbines without altering the general pitch by simply rotating the twist-grip handle 105, and also to modify this power output together with and in harmony with the variations in the general pitch when the pilot actuates the lever 15 pivoted on the horizontal axis, thereby displacing the link 107 constituting the first element of the general pitch control shown in FIG. 7.

Of course, the control actions described hereinabove may be obtained through any other known means, either mechanically as shown or through any suitable electrical, pneumatic or hydraulic servo-devices, or even through a combination of these means.

In the specific embodiment described with reference to FIGS. 1 to 7 of the drawings the power generating unit comprises a front turbine and two rear turbines. However, it would not constitute a departure from the essential principles of this invention to provide other turbine coupling arrangements.

Thus, as illustrated diagrammatically in FIG. 9, the helicopter may comprise a pair of front turbines 19a, 19b and a rear turbine 19c. In this case, the turbines 19a, 19b are connected directly to a coupling gearing 36b of substantially the same type as the gearing 36, which is provided with a rear output shaft connected to the transmission gearing 29. The rear turbine 19c is connected through a counter-gearing 36c similar to the counter-gearing 36a and connected in turn through a front output shaft to the transmission gearing 29, and through a rear output shaft to the anti-torque tail rotor 6.

In the case of a four-turbine arrangement the assembly would comprise a first group of two front turbines (as shown in FIG. 9) and another group of two rear turbines (as shown in FIG. 4).

In order to simplify the drawings and the disclosure, the helicopter according to the second embodiment is not illustrated, but its general arrangement is that shown in FIGS. 1 and 2.

Figure 10:
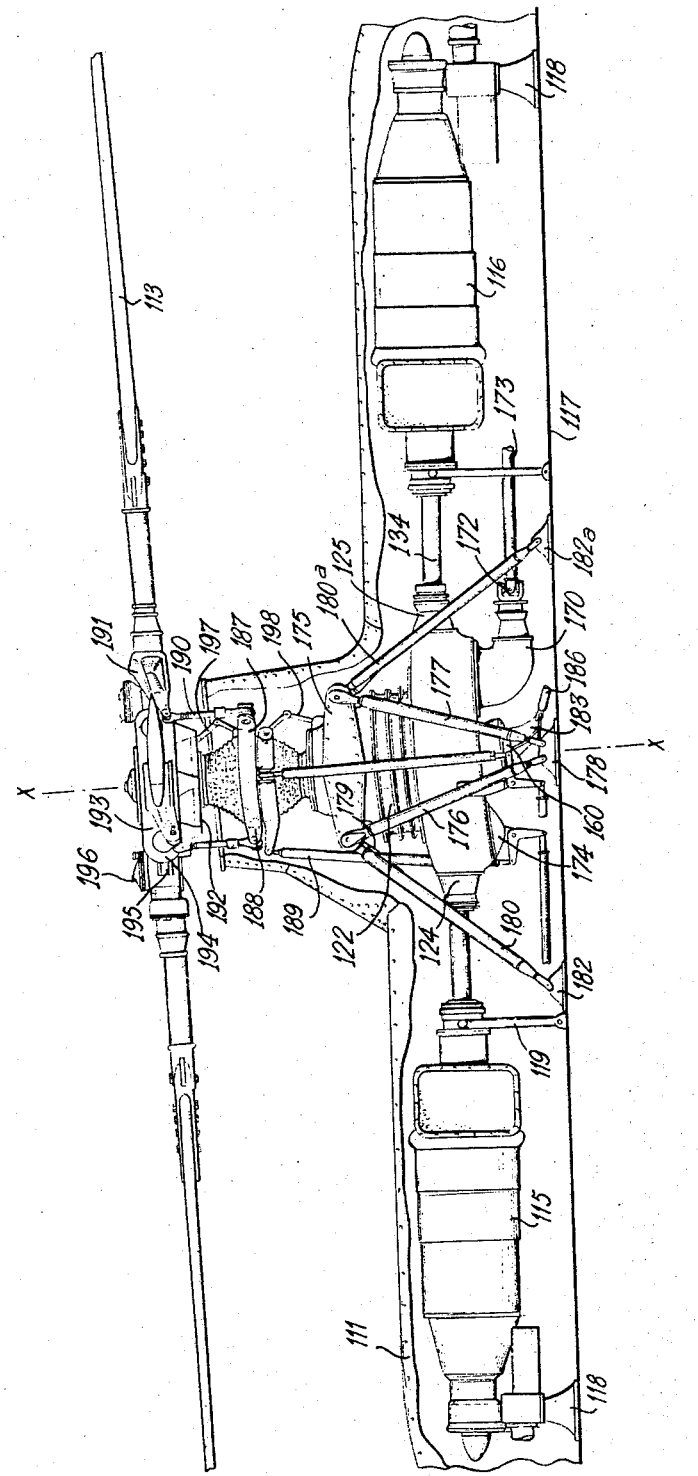
FIG. 10 is a part-sectional side view with parts broken away, showing the turbine room, the rotor shaft carrying the rotor proper and the transmission between the turbines and the rotor shaft, according to another embodiment of the helicopter of this invention.

Mounted on the fuselage portion constituting the passengers' cabin of the helicopter illustrated in FIG. 10 is a housing 111 enclosing the power unit for driving the helicopter rotor shaft 112 extending through this housing and supporting at its upper end the four-blade rotor 113. In this housing 111 are located three free turbine units, that is, two front turbines 114, 115 disposed as symmetrically as possible relative to the longitudinal axis of the helicopter, as a function of the rotor control members disposed therebetween, and a rear turbine 116 located on the left-hand side of the aircraft (see FIG. 11). These turbines are secured on the ceiling 117 of the cabin which constitutes a fire-bulkhead associated if necessary with shielding partitions similar to the partitions 23 and 24 of FIG. 4 in the rotor region of the turbines if the latter are not of a type precluding any risk of bursting. This floor is substantially horizontal when the helicopter is flying or on the ground.

Each turbine is secured at its front portion on the floor 117 by means of a pyramid-shaped support 118. Its rear portion is secured on the floor by means of two links 119 pivoted on transverse horizontal pins, that is, a pin 120 rigid with the turbine casing and a pin 121 rigid with the floor 117 (see FIGS. 10 and 16).

The axis X—X of the rotor is slightly inclined forwards by about 6° when the floor 117 of the mechanical and motor assembly is horizontal. Moreover, it is inclined transversely to the right to absorb the rear antitorque (FIG. 12). The transmission of the turbine power to the rotor occurs through a gearing 122 which, in the embodiment shown in the figures, comprises two front inputs 123, 124 and one rear input 125. It may be noted that due to the forward inclination of the rotor axis X—X the rear turbine lies at a higher level than the front turbines 114, 115 relative to the floor level.

The power take-off of each turbine is at the rear end thereof and offset laterally of the turbine axis, as shown in FIG. 11. As illustrated in FIG. 14 this power take-off comprises a free-wheel device 126 having locking rollers 127 mounted on the output shaft of the relevant turbine. This device terminates with a hollow shaft 128 provided with internal splines 129 having slidably mounted therein an externally splined hub 130 (see FIG. 15) ending with a flange on which a bell-shaped member 131 provided with internal splines 132 is bolted. Mounted in this bell-shaped member 131 is an externally splined annulus 133 meshing with the splines 132 and secured on the end flange of the connecting shaft 134. Two packings 135, 135a are interposed between this annulus 133 and the bell-shaped member 131. Thus, in spite of the rigid mounting of the turbine on the floor 117, any expansion in the axial direction is absorbed by the relative movements of the splines 132. The same expansion absorbing arrangement is provided at the other end of the connecting shaft 134. With these specific mountings it is also possible to absorb any movements of the connecting member which may be caused by any distorsion during a flight.

The bell-shaped member 131a in meshing engagement with the toothed annulus 133a mounted on the end of the connecting shaft 134 which is remote from the turbine is rigidly assembled for example by bolting with a flanged socket 130a formed with internal splines 136 to drive the hub 137 of a bevel gear 138 journalled in the corresponding input member 125 of the transmission gearing by means of a pair of bearings 139, 140.

This bevel gear 138 meshes with another bevel pinion 141 of greater diameter to constitute therewith a first speed-reducing stage. This pinion 141 is secured on the hollow hub 142 of a spur gear 143 mounted in the transmission gearing case through bearings 144, 145. The spur gear 143 meshes with a relatively large horizontal toothed wheel or spur gear 146 centered on the rotor shaft 112. This larger gear 146 has its hub 147 projecting above and below the plane of the gear and the hub ends are mounted in adequate bearings 148, 150 fitted the former in an intermediate partition 149 of the transmission case and the latter in the bottom end wall of this case.

The hub 147 of the large toothed wheel 146 is formed with internal splines 151 meshing with external teeth formed in the hub 152 of a spur gear 153 overlying the bearing 148, as shown. This gear 153 meshes in turn with planet gears 154 mounted on shafts 155 carried by a rotary plate or planet carrier 156 provided in turn with splines 157 meshing with corresponding splines formed on the rotor shaft 112. These planet wheels mesh on the other hand with an internal set of fixed teeth 158 provided internally of the transmission case, as shown. The shaft 112 is centered in this case on the one hand through bearings 159 at its lower end, beneath the bearings 150 in the lower cover 160 of this case, and on the other hand through bearings 161 overlying the planet carrier 156 in a socket 162 on which the upper cover 163 of the gearing case is mounted.

The resulting assembly constitutes a three-stage reducing gear providing a substantial gear reduction as required and convenient for a high-speed input. Thus, in the embodiment illustrated, the output shafts of the turbines may rotate at 6,000 r.p.m., the output velocity of gear 143 being in this case 3,000 r.p.m., the output velocity of gear 146 being 800 r.p.m., and the rotor shaft 112 is driven at 267 r.p.m.

The shaft 112, as shown notably in FIG. 13 of the drawings, is hollow to permit the passage therethrough of any desired elements such as electric conductors and tubings leading to and from testing or measuring apparatus.

As shown in FIG. 13, the transmission gearing arrangement illustrated will facilitate the design of the antitorque rotor power take-off. The gear 143 is hollow and provided with an internal set of teeth 164 meshing with a gear 165 carried by a shaft 166 provided at its opposite end with a bevel gear 167 having its hub centred by bearings 167a in a journal 167b formed in the case-forming lower cover 170 of the transmission. The bevel gear 167 meshes with another bevel gear 168 centred through bearings 169, 170a in an extension 171 of the cover-case 170. This bevel gear has its hub assembled by means of a universal joint 172 with the driving shaft 173 of the anti-torque tail rotor.

If no power take-off is provided on the spur gear 143a of the first turbine-driven reducing stage, as shown in FIG. 14, the assembly terminates at the bearing 144a and the transmission gearing case is provided with a cover 174 underlying the pair of gears 141a, 143a. The other members similar to those illustrated in FIGS. 13 carry the same reference numerals followed by the letter a.

Instead of having the power take off as may be required to drive the anti-torque rear rotor, the oil pumps and, as a rule, any other auxiliary appliances of the helicopter, by drivingly connecting this power take-off with the input from a turbine, it is possible, due to the relatively large dimensions of the horizontal toothed wheel 146, to provide a special power-take-off comprising a gear similar to the pinion 143 and other gears similar to the pinions 165, 167 and 168 at any desired point on the periphery of the horizontal wheel 146.

As illustrated in FIGS. 10 to 13, the case of the transmission gearing is provided at its upper portion with fixation fittings 175 each formed with a pair of end lugs on which are pivoted through transverse pins a pair of tubular V-forming adjustable links 176, 177 having their lower ends pivoted on a common support 178 secured on the floor 117. On the other hand, upper front and rear faces of the transmission gearing case have pivotally mounted thereon through oblique pivot pins a pair of adjustable tubular links 179, 180 at the front, and 179a, 180a at the rear, the lower ends of these links being pivoted on substantially transverse pins carried by supports 181, 182 at the front and 181a, 182a at the rear, these supports being secured on the floor 117. The lower central cover 160 of the transmission gearing case is provided with a depending extension 183 carrying the lug 184 on which are pivoted through vertical pins a pair of tubular links 185, 186 adapted to have their other ends secured on the floor about a vertical axis. This mounting is similar to the conventional mounting of radial engines and its principles may be applied provided that the transmission gearing case has a different form.

The mechanisms in the transmission gearing case is lubricated in the conventional manner by spraying the lubricant under pressure in the form of a shower at the top of the case, adequate filter means being provided at suitable locations, preferably at the bottom, for example in the cover 174, central cover 160 and case-forming cover 170. These lubricating means are not shown in the drawings since they are conventional in the art.

Surrounding the rotor shaft 112 and mounted in the usual fashion is the cyclic plate assembly comprising the movable member 187 and the fixed member 188 with the pitch-varying links 189, pitch-control links 190 coupled to the pitch-changing levers 191 carried by the rotor blades 193 and the lower blade rests 192. The rotor hub 193 comprises flapping joints 194 permitting the blade movement transversely of their plane of rotation, these blades comprising in turn drag joints 195 provided with shock absorbers 196. The movable member 187 of the cyclic plate is connected to the rotor shaft 112 in the usual manner, that is, by means of a pair of struts 197 whereas the fixed portion 188 of this cyclic plate is held against rotational movements by another pair of struts 198 secured on the case of the transmission gearing 122.

In the specific embodiment described with reference to FIGS. 10 to 13 of the drawings the power generating members comprise two front turbines and a rear turbine; however, it is evident that other turbine arrangements may be provided without departing from the purpose of this invention; thus, the relatively large central gear 146 of the transmission gearing may be engaged peripherally by any desired and suitable number of pinions.

To exemplify this arrangement shown diagrammatically in FIG. 17 the helicopter is driven from two front turbines 114a, 115a similar to the turbines 114, 115 of FIGS. 10 and 11, and from a pair of rear turbines 114b, 115b disposed behind the transmission gearing 122a and connected thereto in the same manner as the front turbines 114a, 115a.

Similarly, as shown in FIG. 18, the helicopter may comprise in the same arrangement two pairs of turbines 114a, 115a at the front and 114b, 115b at the rear, and laterally on either side of the transmission gearing 122b another pair of opposite turbines 116a, 116b which are disposed relative to the right-hand and left-hand sides of the gearing like the turbine 116 relative to the rear side of the gearing 122 in the embodiment of FIGS. 10 and 11.

The multi-engine arrangement constituting one of the essential features of this invention improves considerably the safety factor of the helicopter. Moreover, by substituting turbines for piston engines as power unit a substantial reduction is obtained in the weight of the aircraft as well as in the over-all dimensions, and a vibrationless operation results while eliminating any pre-heating period at the start and permitting of using fuels of different types.

It will be readily understood by anybody conversant with the art that many modifications may be brought to the few embodiments shown and described hereinabove without departing from the scope of the invention as set forth in the appended claims.

What we claim is:

1. In a single-rotor, heavy-tonnage helicopter having a fuselage carrying a rear anti-torque rotor of conventional type and including a front pilot's cockpit, a cabin behind said cockpit, and a housing overlying said cabin and wherein are located, on the one hand, a transmission box coaxial with the rotor driving shaft and, on the other hand, at least three free turbine units having their axes parallel to the longitudinal plane of symmetry of the helicopter which passes through the axis of said shaft, said turbines being provided with securing means on the housing floor and connecting means with said transmission box and being disposed in two groups respectively located in front and behind the transmission box, one of said free turbine units being provided with the power take-off for the anti-torque rotor; the improvement which comprises a transmission box having two diametrally opposite front and rear input gears having a common axis at right angles to the axis of the rotor driving shaft and disposed in the longitudinal plane of symmetry of the helicopter; for the front group, at least one turbine positioned on one side of the aircraft, a shaft provided with universal joints and directly interconnecting the power output of said turbine and the front input gear of the transmission box, and a free-wheel device interposed in said shaft, and at most one further turbine disposed symmetrically to the first turbine with respect to the longitudinal axis of the aircraft, a front coupling case enclosing said free-wheel device and a further free-wheel device connected to said further turbine and to said shaft; and, for the rear group, at least one turbine located on one side of the aircraft, a counter-gearing case having a free-wheel device connected to said turbine and a shaft provided with universal joints and interconnecting the output of the counter-gearing case and the rear input gear of the transmission box, and at most one further turbine disposed symmetrically to the first turbine with respect to the longitudinal axis of the aircraft, a rear coupling case enclosing said free-wheel device and a further free-wheel device connected to said further turbine and to said shaft, the power output of the turbines of the rear group being directed towards the rear of the helicopter.

2. In a single-rotor, heavy-tonnage helicopter having a fuselage carrying a rear anti-torque rotor of conventional type and including a front pilot's cockpit, a cabin behind said cockpit, and a housing overlying said cabin and wherein are located, on the one hand, a transmission box coaxial with the rotor driving shaft and, on the other hand, at least three free turbine units having their axes parallel to the longitudinal plane of symmetry of the helicopter which passes through the axis of said shaft, said turbines being provided with securing means on the housing floor and connecting means with said transmission box and being disposed in two groups respectively located in front and behind the transmission box, one of said free turbine units being provided with the power take-off for the anti-torque rotor; the improvement which comprises a transmission box provided with a horizontal, cylindrical and relatively large input toothed wheel; and, for the front and rear groups, respectively at least one and at the most two turbines, the power output of said turbines being directed towards the transmission box; a free-wheel device directly connected with the power output of each turbine, a connecting shaft substantially parallel to the housing floor and connected with said free-wheel device, a first counter-gear carried by said connecting shaft, a second counter-gear in meshing engagement with said first counter-gear for forming a first gear-ratio reducing stage and the axis of which is substantially parallel to that of the driving shaft, and a cylindrical gear coaxial and rigidly associated with said second counter-gear and in meshing engagement with said toothed wheel.

3. A helicopter according to claim 1, wherein, the front group comprises a single turbine, the means for securing said turbine on the floor of the housing comprising two lateral supporting assemblies each one of which comprises a yoke with transverse pivoting axis secured on the floor, a strut having one end pivoted on said yoke, a support mounted on the turbine case and an elastic joint interconnecting said support and the other end of said strut in order to permit the longitudinal displacements, and a tripod secured on the floor and at the rear of the turbine along the longitudinal axis thereof.

4. A helicopter according to claim 1, wherein, the means for securing on the housing floor the turbines of a group of two turbines comprise two lateral supporting assemblies each one of which comprises a yoke with transverse pivoting axis secured on the floor, a strut having one end pivoted on said yoke, a support mounted on the corresponding turbine case and an elastic joint interconnecting said support and the other end of said strut, in order to permit the longitudinal displacements, and a support secured on the floor and to the lower portion of the corresponding coupling case or counter-gearing case, in alignment with the axis of symmetry and in the longitudinal axis of said floor.

5. A helicopter according to claim 1, wherein the transmission box is provided with the base member and further comprising two pairs of tubular stays interconnected in each pair for forming a reversed V and respectively pivoted at their connecting points on either side of said transmission box around axes disposed on a diameter substantially perpendicular to the longitudinal plane of symmetry of the aircraft, supports carried by the floor and on which are secured the ends of said tubular stays, and a set of bolts for securing said base member on the floor.

6. A helicopter according to claim 1, wherein the transmission box is provided with a base member and further comprising two pairs of tubular stays interconnected in each pair for forming a reversed V and respectively pivoted at their connecting points on either side of said transmission box around axes disposed on a diameter substantially perpendicular to the longitudinal plane of symmetry of the aircraft, yokes with transverse pivoting axes carried by the floor and on which are pivoted the lower ends of said tubular stays, a transverse plate secured under the base member of the box, tubular legs with adjustable length articulated about substantially vertical axes on the ends of said transverse plate and pivotal about transverse axes on the lower ends of said tubular stays, and a tie-rod interconnecting the central part of said transverse plate and one of the front yokes.

7. A helicopter according to claim 2, wherein the means for securing each turbine on the housing floor comprises two front and rear supports each one of which consists of two members rigidly secured on either side of the turbine, and two pairs of front and rear yokes with transverse axes on which pivot the ends of said members, and wherein splined members are inserted between the connecting shaft and, on the one hand, the freewheel device and, on the other hand, the first countergear for permitting the free axial expansion of the turbine elements.

8. A helicopter according to claim 2, wherein the transmission box comprises a second reducing gear train driven by the toothed wheel, one row of planet gears overlying said toothed wheel and in meshing engagement with the output gear of said second reducing gear train and with teeth formed on the inner surface of the box case, a rotary plate secured on the driving shaft and carrying said planet gears, and two anti-friction bearing assemblies for journalling said driving shaft, disposed beneath said toothed wheel and above said plate, respectively.

9. A helicopter according to claim 2, further comprising, on either side of the transmission box, two double-yoked supports with substantially transverse pivoting axes secured on the floor and two tubular stays with adjustable length respectively pivoted on the yokes of said support, disposed in a V-shape and the upper end of which are pivoted on said box around transverse axes; at the front and at the rear of said box, two pairs of yokes with transverse pivoting axes secured on the floor substantially in alignment with said double-yoked supports at the front and at the rear of said box, respectively, and tubular stays with adjustable length lower ends of which are respectively pivoted on said yokes while their upper ends are pivoted about oblique axes on the corresponding front and rear parts of the box, respectively; and two tubular rods pivoted at one of their ends around vertical axes on the bottom of the box, disposed in a much opened V-shape and the other ends of which are articulated on the floor around vertical axes.

10. A helicopter according to claim 2, further comprised at least one and at the most two lateral turbines which are disposed in the last case on either side of the transmission box, the power outputs of said turbines being directed towards the transmission box.

11. A helicopter according to claim 2, further comprising power take-offs on the transmission box, such as those for driving the anti-torque tail rotor or the oil pumps and axiliary appliances of the aircraft, each take-off consisting of a pinion meshing with an internally toothed ring integral with the cylindrical gear, a downwardly directed shaft carrying said pinion, a gear train having two gear members the first one is carried by said shaft, and an output shaft carrying the other gear member.

12. A helicopter according to claim 2, further comprising power take-offs on the transmission box, such as those for driving the anti-torque tail rotor or the oil pumps and auxiliary appliances of the aircraft, each take-off consisting of a cylindrical pinion meshing with the toothed wheel and integral with an internally toothed ring, a second pinion meshing with said ring, a downwardly directed shaft carrying said second pinion, a gear train having two gear members the first one is carried by said shaft, and an output shaft carrying the other gear member.

References Cited in the file of this patent

UNITED STATES PATENTS

| | | |
|---|---|---|
| 1,049,927 | Sieg | Jan. 7, 1913 |
| 1,899,490 | Wiedmann | Feb. 8, 1933 |
| 2,514,206 | Perry | July 4, 1950 |
| 2,587,345 | Lombard | Feb. 26, 1952 |
| 2,591,913 | Bowers | Apr. 8, 1952 |
| 2,653,778 | Bennett | Sept. 29, 1953 |
| 2,753,140 | Hasbrauck | July 3, 1956 |
| 2,755,038 | Gluhareff | July 17, 1956 |
| 2,811,324 | Alex | Oct. 29, 1957 |
| 2,847,872 | Todd | Aug. 19, 1958 |